United States Patent [19]
Bryant et al.

[11] Patent Number: 6,141,793
[45] Date of Patent: Oct. 31, 2000

[54] APPARATUS AND METHOD FOR INCREASING THE PERFORMANCE OF INTERPRETED PROGRAMS RUNNING ON A SERVER

[75] Inventors: Craig W. Bryant, Fort Collins; Todd M. Goin, Loveland; Thomas J. Moos, Windsor; Douglas W. Steele, Fort Collins, all of Colo.

[73] Assignee: Hewlett-Packard Company, Palo Alto, Calif.

[21] Appl. No.: 09/053,567

[22] Filed: Apr. 1, 1998

[51] Int. Cl.[7] ....................................... G06F 9/445
[52] U.S. Cl. ........................... 717/5; 717/6; 717/7; 716/3
[58] Field of Search .............................. 395/500.04, 705, 395/706, 707; 709/300; 717/5, 6, 7; 716/3

[56] References Cited

U.S. PATENT DOCUMENTS

| | | | |
|---|---|---|---|
| 5,692,198 | 11/1997 | Ushiku | 395/762 |
| 5,717,926 | 2/1998 | Brwning et al. | 395/674 |
| 5,826,088 | 10/1998 | Sitbon et al. | 395/705 |
| 5,870,550 | 2/1999 | Wesinger et al. | 709/215 |
| 5,890,171 | 3/1999 | Blumer et al. | 707/501 |
| 5,892,935 | 4/1999 | Adams | 395/383 |
| 5,892,950 | 4/1999 | Rigori et al. | 395/705 |
| 5,970,249 | 10/1999 | Holzle et al. | 395/705 |

*Primary Examiner*—Ahmad F. Matar
*Assistant Examiner*—Saleh Najjar

[57] ABSTRACT

An apparatus and method provide the execution of interpreted languages, and more particularly increase the performance of interpreted languages execution in application software. The performance increase of interpreted languages execution is achieved by first moving the interpreted code into one process. This process still utilizes the interpreted code and acts like library of interpreted code routines. Next, when the process is to be executed, the interpreted code process forks itself and then has the child process run the already compiled interpreted code. The advantage of doing this is that the interpreted code in the process is compiled only once, when the process is started. With large interpreted code scripts, it is faster to connect up to the interpreted code process and have it fork a child process to execute the correct code than it is to compile and run the correct code.

13 Claims, 9 Drawing Sheets

APPARATUS AND METHOD FOR INCREASING THE PERFORMANCE OF INTERPRETED PROGRAMS RUNNING ON A SERVER

FIELD OF THE INVENTION

The present invention generally relates to the execution of interpreted languages, and more particularly, to increasing the performance of interpreted languages execution in application software.

DESCRIPTION OF RELATED ART

As known in the art, the Internet is a world-wide collection of networks and gateways that use the TCP/IP suite of protocols to communicate with one another. At the heart of the Internet is a backbone of high speed data communication lines between major nodes or host computers consisting of thousands of commercial government educational and other computer systems that route data and messages.

World Wide Web (WWW) refers to the total set of interlinked hypertext documents residing on hypertext transfer protocol (HTTP) servers all around the world. Documents on the WWW, called pages or web pages, are written in hypertext mark-up language (HTML) identified by uniform resource locators (URL) that specify the particular machine and pathname by which a file can be accessed and transmitted from node to node to the end user under HTTP. A web site is a related group of these documents and associated files, scripts, subprocedures, and databases that are served up by an HTTP server on the WWW.

Users need a browser program and an Internet connection to access a web site. Browser programs, also called "web browsers," are client applications that enable an user to navigate the Internet and view HTML documents on the WWW, another network, or the user's computer. Web Browsers also allow users to follow codes called tags imbedded in an HTML document, which associate particular words and images in the document with URLs so that a user can access another file that may be half way around the world, at the press of a key or the click of a mouse. These files may contain text (in a variety of fonts and styles), graphic images, movie files and sounds as welt as java applets, perl applications, other scripted languages, active X-controls or other small imbedded software programs that execute when the user activates them by clicking on a link.

Scripts are applications that are executed by a HTTP server in response to a request by a client user. One type of script is a common gateway interface (CGI) script. Generally, a cgi script is invoked when a user clicks on an element in a web page, such as a link or image. Cgi scripts are used to provide interactivity in a Web page. Cgi scripts can be written in many languages including C, C++ and Perl. A cgi-bin is a library of cgi scripts applications that can be executed by a HTTP server.

Java, developed by Sun Microsystems, and Perl, developed by Larry Wall at NASA, are object oriented, multi-threaded and dynamic languages that require compilation and interpretation for execution. First, a program in each language is compiled into byte-codes. These languages then require interpreters that translate the complied byte-code into machine code for a particular central processing unit (CPU) at run-time.

Java permits a program to be compiled into byte-code once and interpreted many times. Whereas, Perl requires that the program be compiled into byte-code each time it is interpreted. This compilation and interpretation causes these languages to execute much slower than other compiled languages, such as C or C++.

Perl (practical extension and report language), is often used to implement cgi-bin scripts. These scripts are invoked by the http deamon to do a single job, and then they exit. Perl is often used because it has powerful text handling methods, and it is easy to use. The problem with using perl is that the perl code in the cgi-bin script is compiled every time the cgi-bin script is run. When the size of the cgi-bin scripts gets large, the amount of time spent compiling the Perl code can be a performance limiter.

Until now, interpreted languages have lacked the ability to provide high-performance execution of application programs and procedures.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus and method for increasing the performance of interpreted languages execution for tasks requiring fast execution of programs using interpreted language application software.

In accordance with the apparatus and method of the present invention, one embodiment of this invention works by moving the code that was in the individual cgi-bin scripts into one Perl server daemon process. This server is still in Perl and very minor changes are needed to turn them into library routines. The individual cgi-bin scripts are replaced by an object file (the proxy) that calls the daemon process to execute the code that would be in the cgi-bin script on the proxy's behalf. The Perl server does this by forking itself and then having the child run the already compiled code for the specific cgi-bin script. The advantage of doing this is that the Perl code in the Perl server process is compiled only once, when the Perl server is started. With large Perl scripts it is faster to connect up to the server and have it fork a child and execute the correct code than it is to compile and run the correct code.

BRIEF DESCRIPTION OF THE DRAWINGS

The accompanying drawings incorporated in and forming a part of the specification illustrate several aspects of the present invention, and together with the description, serve to explain the principles of the invention. In the drawings.

DETAILED DESCRIPTION OF THE PREFERRED EMBODIMENT

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
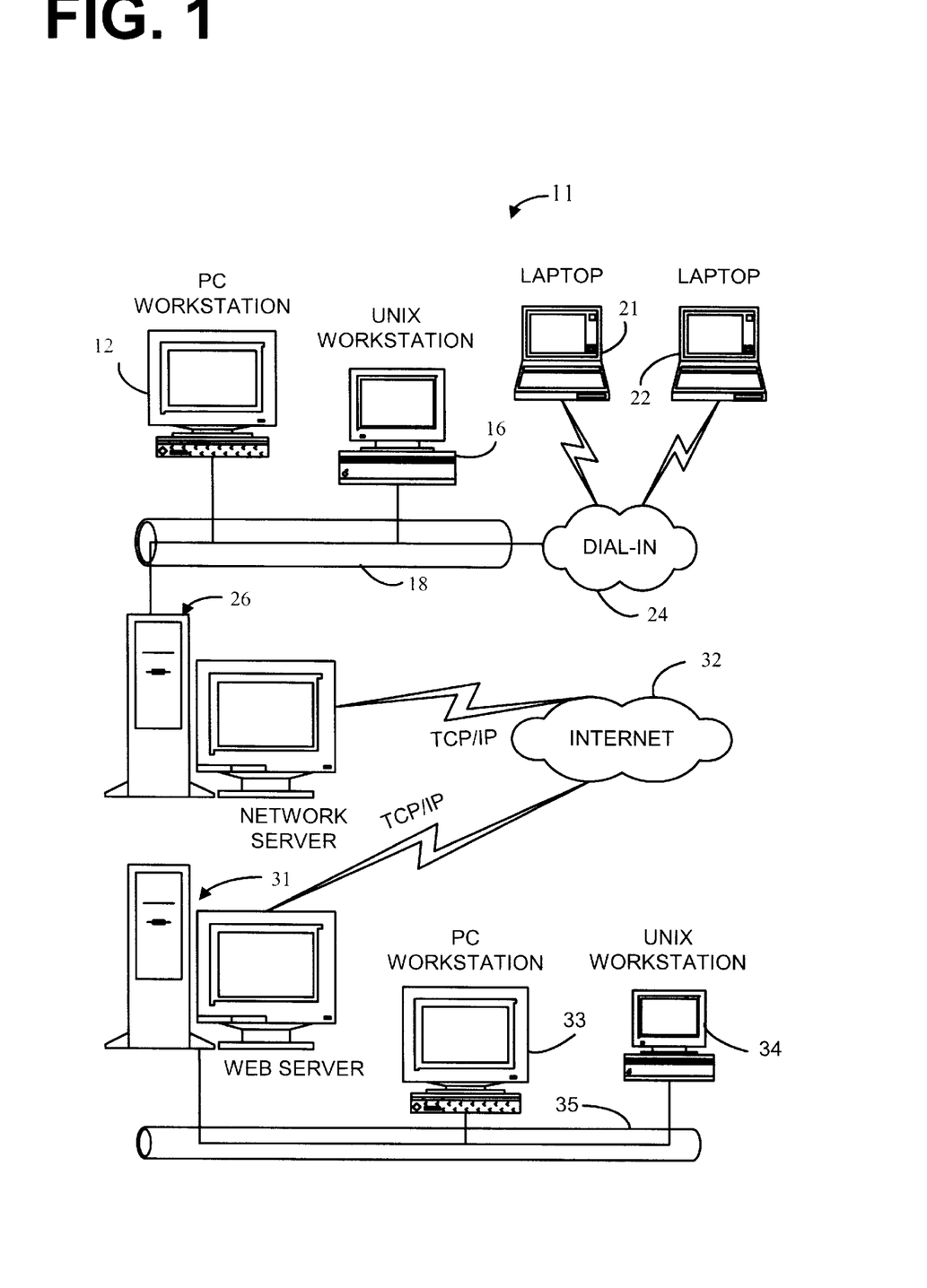
FIG. 1 is a block diagram of the client/server system utilizing the Internet.

Turning now to the drawings, FIG. 1 is a block diagram of just one system configuration that illustrates the flexibility, expandability, and platform independence of the present invention. While the system configuration could take many forms, the diagram of FIG. 1 illustrates a plurality of diverse workstations 12, 14 and 16 directly connected to a network, for example, but not limited to, a LAN 18. Additional workstations 21, 22 may similarly be remotely located and in communication with the network 18 through a dial-in or other connection 24. Each of the workstations in FIG. 1 are uniquely illustrated to emphasize that workstations may comprise a diverse hardware platform.

As is well known, browser applications are provided and readily available for a variety of hardware platforms. Browsers are most commonly recognized for their utility for accessing information over the Internet 32. As aforementioned, a browser is a device or platform that allows a user to view a variety of service collections. The browser retrieves information from a web server 31 or network server 26 using HTTP, then interprets HTML code, formats and displays the interpreted result on a work station display.

Additional work stations 33 and 34 may similarly be located and in communication with the web servers 31 for access to web pages on the local server and the Internet. Work stations 33 and 34 communicate with the web server 31 on a network 35. Networks 18 and 35 may be, for example, Ethernet type networks, also known as 10 BASE 2, 10 BAS 5, 10 BSAF, 10 BAST, BASE BAN network, CO-EX cable, and the like.

Figure 2:
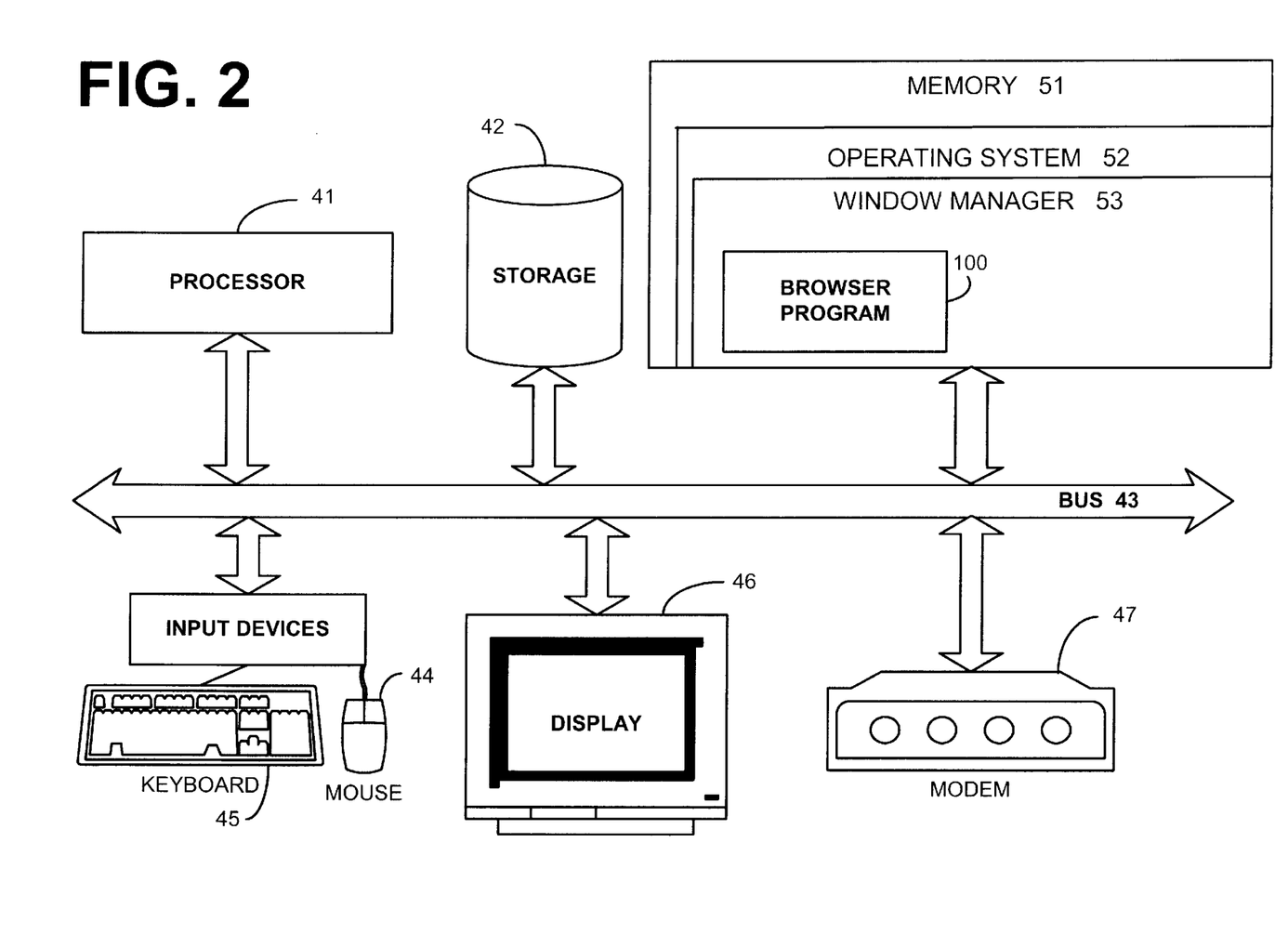
FIG. 2 is a block diagram illustrating a browser program situated within a computer readable medium, for example, in a computer system of the client systems.

As illustrated in FIG. 2 client systems today generally include only a browser program 100 (e.g., Netscape, Internet Explorer, or other browser program) for use in accessing locations on a network 11. These browser programs 100 reside in computer memory 51, and access communication facilities modem 47 to transport the user to other resources connected to the network 11. In order to find a resource, the user must know the network location of the resource denoted by a network location identifier or URL. These identifiers are often cryptic, following very complex schemes and formats in their naming conventions.

Systems today identify, access, and process these resources desired by a user by using the processor 41, storage device 42, and memory 51 with an operating system 52 and window manager 53. The processor accepts data from memory 51 and storage 42 over the bus 43. Direction from the user can be signaled by using the input devices mouse 44 and keyboard 45. The actions input and result output are displayed on the display terminal 46.

The first embodiment of the present invention involves the browser program 100. The browser program 100 is the software that interacts with the server to obtain the requested data and functionality requested by the client user. The client browser program 100 will be described hereafter in detail with regard to FIGS. 4 and 5.

Figure 3:
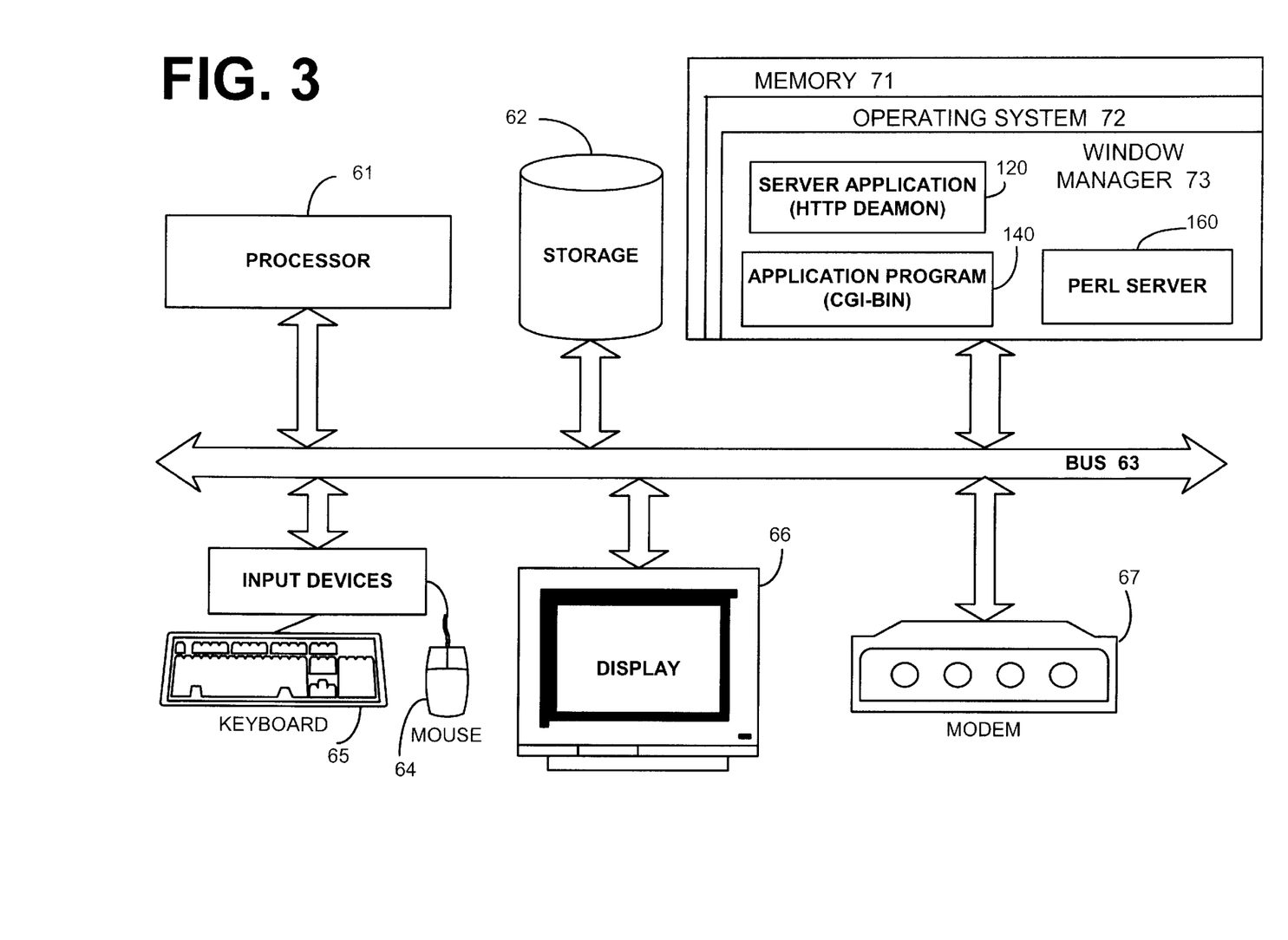
FIG. 3 is a block diagram illustrating a server's service application program, the Perl server process and the Child Perl server process situated within a computer readable medium, for example, in a computer system of the server systems.

Illustrated in FIG. 3 is the architecture of the server system 26 and 31. The principal difference between the servers 31 and 26 and the clients 12, 16, 21, 22, 33 and 34, illustrated in FIG. , are that the clients systems interface to the user and request the functionality through the browser program 100, while the servers 26 and 31 provide the services requested by the client utilizing the server application program 140 and the server 160. Otherwise, the functionality of processor 61 is storage 62, mouse 64, keyboard 65, display 66, and modem 67 are essentially the same as corresponding items of FIG. 2. As known in the art, the client systems 12, 14, 16, 21, 22, 33 and 34, and server systems 26 and 27, may reside on the same physical machine.

The principal difference in the server is that the memory 71 interacting with the operating system 72 and the window manager 73 provide the services requested by the client utilizing the server application 120, application program 140, and server 160. Server application 120, application program 140, and server 160 will herein be defined in more detail with regard to FIG. 4 and FIGS. 6, 7, 8 and 9.

Figure 4:
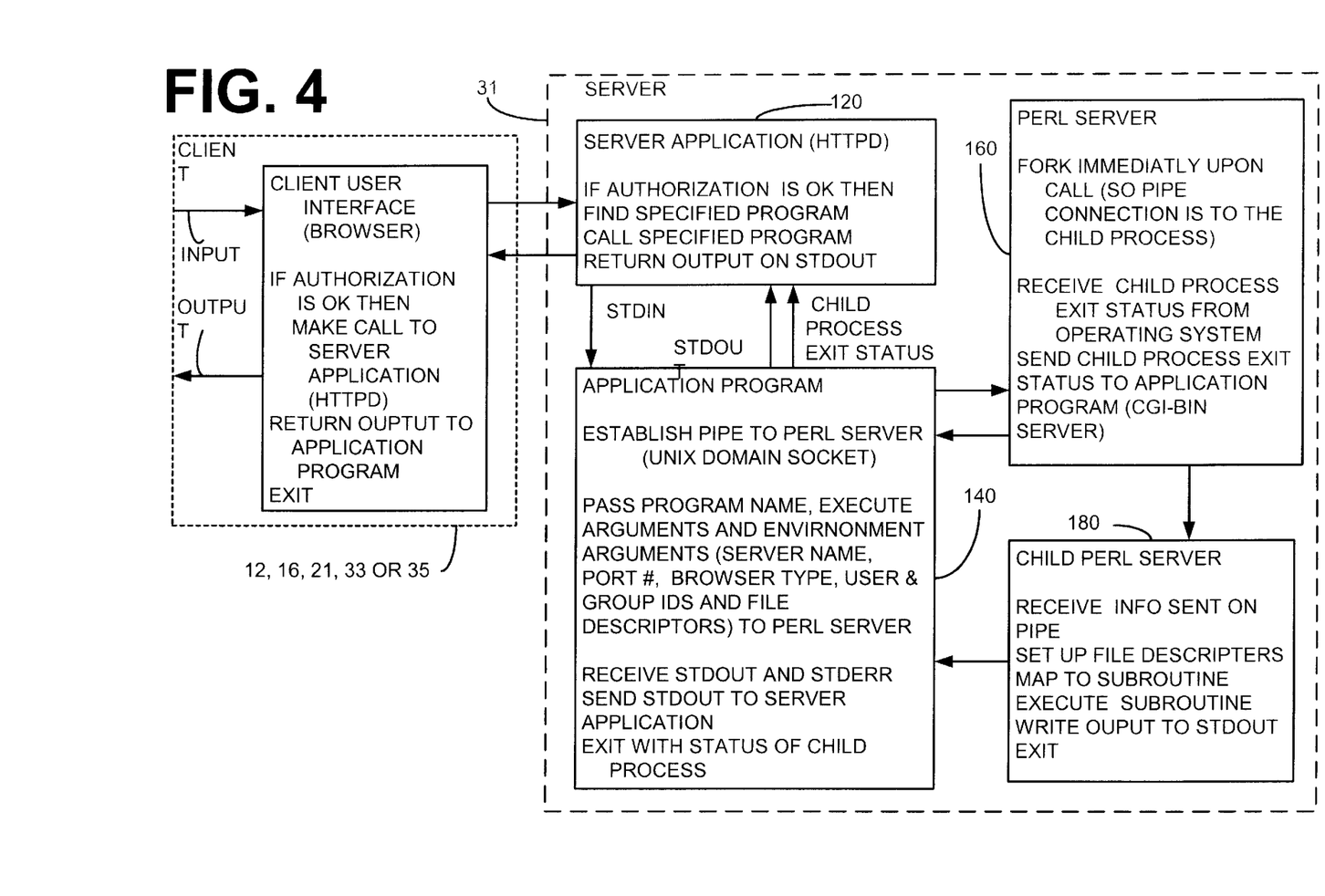
FIG. 4 is a block diagram illustrating the process for client browser, and the server's server application, service application program, the Perl server and the Child Perl server processes, as shown in FIGS. 2 and 3.

With regard to FIG. 4, the client system 12, 16, 21, 22, 33 or 34 can request services from the web server 31 by utilizing the client system program 100. The browser user interface program first receives a request from the user and checks to make sure that the user is authorized to access a particular function and then the client browser program makes a call to the server application to access the requested information. This request for service goes out on a network line to the server 31 and is received by the server application 120.

The server application 120 then checks to see that the user is authorized to access a specified program and if the authorization is satisfied, the server application 120 finds the specified program and calls the specified program by invoking cgi-bin application 140 using the program name and arguments.

The cgi-bin application 140 establishes a line to a server based upon the specified program name. The cgi-bin application 140 then passes the program name and executive arguments and environmental arguments to the Perl server 160 that are needed to provide the requested service.

Perl server 160 receives the program name execution arguments and environmental arguments and forks immediately upon the establishment of the pipe connection so that pipe connection from the application program is connected to both parent Perl server process 160 and the child Perl server process 180. The child Perl server process 180 receives the information sent across the pipe, sets up the file descriptors, maps to the requested sub routine, executes the sub routine and writes the output to a stdout which is then returned to cgi-bin application 140. When the output is sent to the cgi-bin application 140, the child process 180 exits and therefore ceases to exist.

Upon the termination of the child Perl server process 180, the parent Perl server 160 receives the child Perl server process 180 exit status from the operating system and sends the child Perl server process 180 exit status to application program 140 and then terminates that pipe. Cgi-bin application 140 receives the output of the server 160 and any error codes and returns the output to the server application 120. The cgi-bin application 140 then exits with the same exit status of the child Perl server process 180. Server application 120 receives the output of the cgi-bin application 140 and the exit status of the child Perl server process 180 and returns the output over a network to the client 12 or 16 browser program 100. The browser program then returns the output to the application program that requested service in the client system. This process will be further explained hereafter with regard to FIGS. 5–9.

Figure 5:
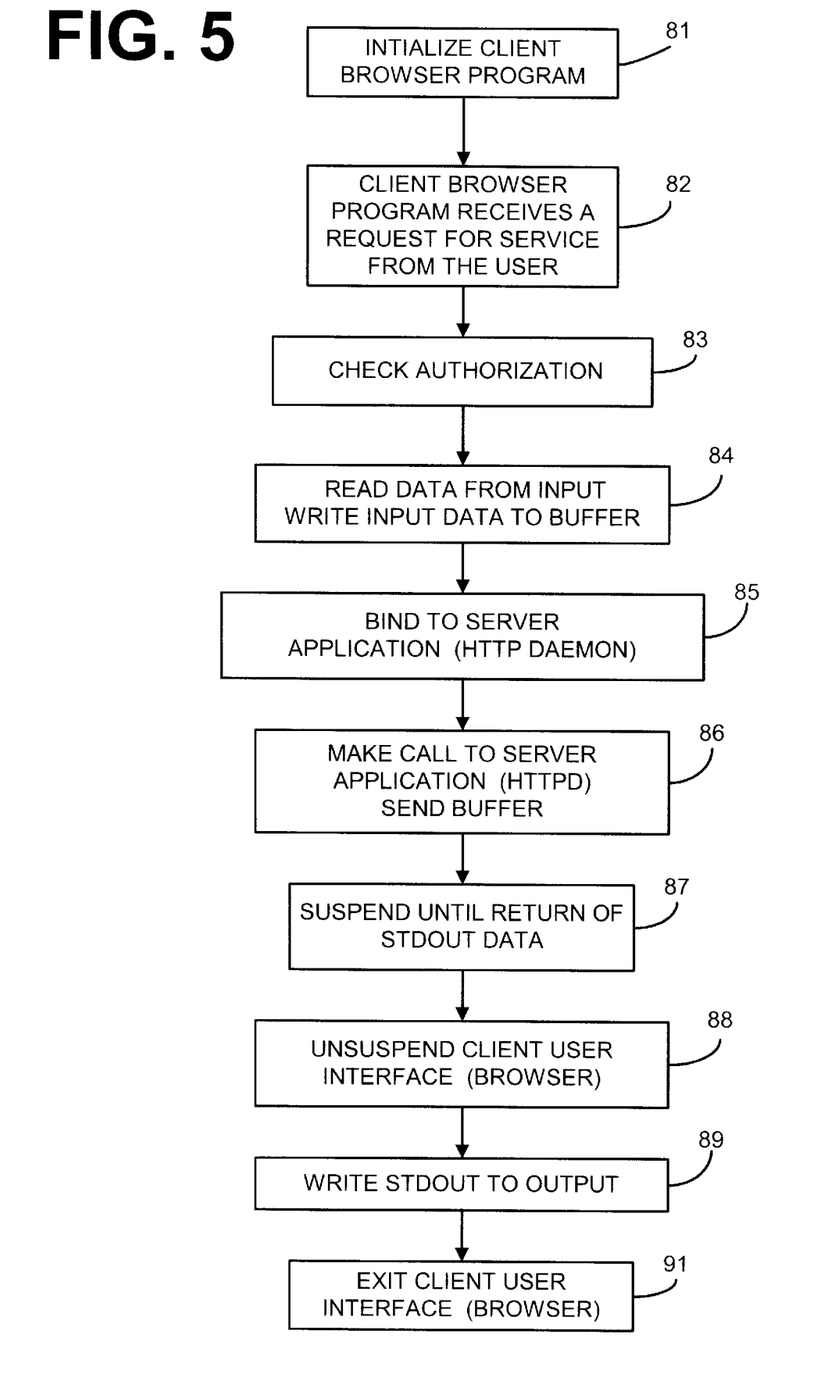
FIG. 5 is a flow chart of the process for the client browser of the present invention, as shown in FIG. 4.

The browser program 100 process in the client system is illustrated in FIG. 5. The first step of the browser program 100 is to initialize the client browser program at step 81. The browser program 100 receives the request for service from the user at step 82. The browser program 100 checks the authorization of the user for the requested service at step 83. The browser program then reads the data from the requests for service and writes the input data to a buffer at step 84. The browser program 100 then binds to the server application at step 185. The browser program 100 makes a call to the server application and sends the buffer data at step 86 to the server application 120. The user browser program is then suspended until the returning of data at step 87. When data is returned to the client user interface, the browser is unsuspended and writes at step 88 and the browser program writes the data received from server application 120 to the output to the client application program at step 89. The client user interface browser then exits that process at step 91.

Figure 6:
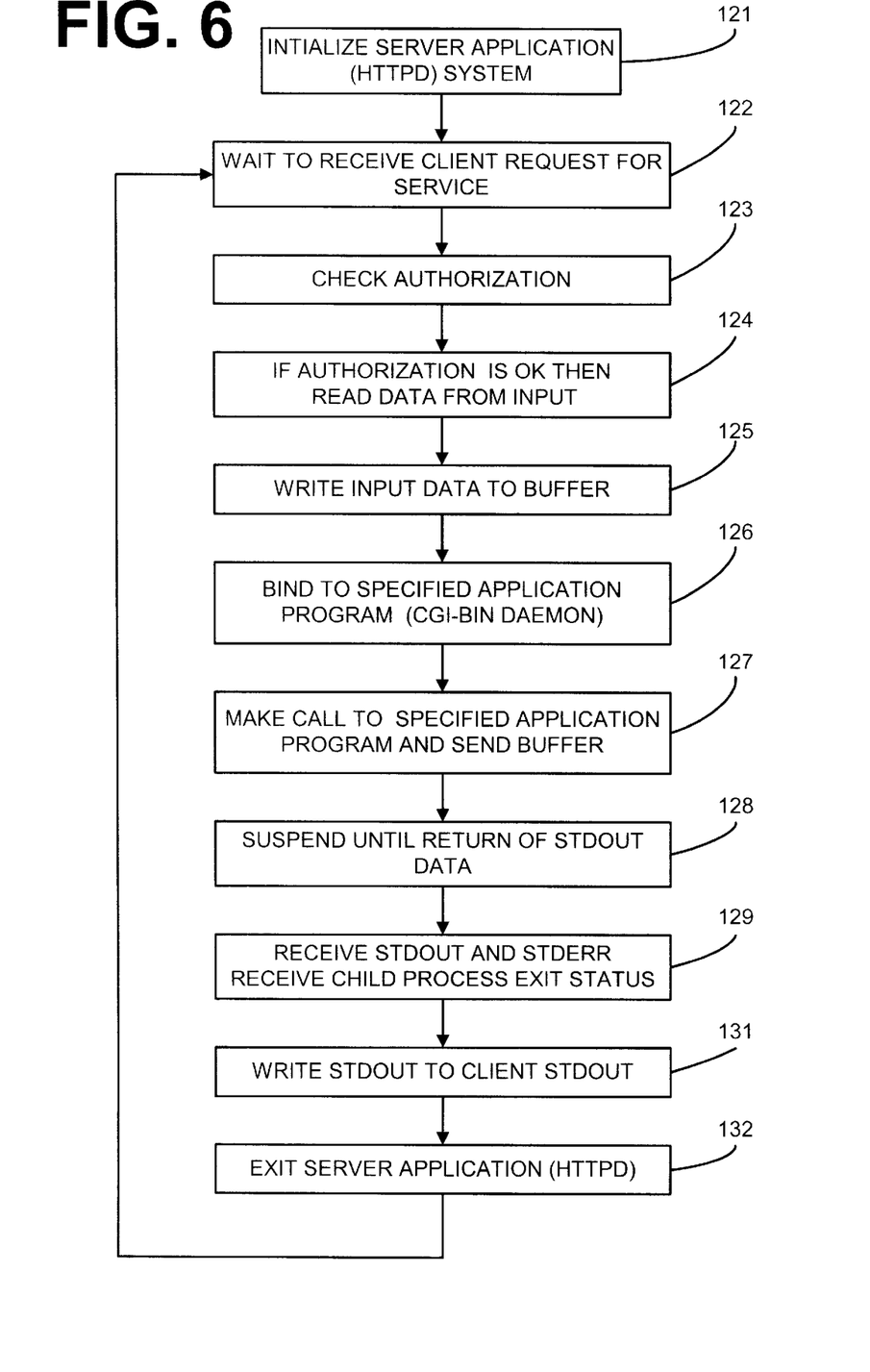
FIG. 6 is a flow chart of the process for the server's server application of the present invention, as shown in FIG. 4.

Illustrated in FIG. 6 is the flow diagram of the process for the server application 120. The server application 120 is initialized at step 121. The server application 120 then waits to receive a client request for service at step 122. When a client request is received at step 122, the server application 120 checks the authorization of that client to make sure that that client is authorized to access the functionality the client has requested at step 123. Next, if the authorization is satisfied, the server application then reads the data input from the client browser program 100 at step 124. The server application writes any input data to a buffer at step 125. Next, the server application 120 then determines which application program will provide the service requested by the client system at step 126 and the server application 120 binds to the specified cgi-bin application 140. The server application 120 then invokes the specified cgi-bin application 140 and sends the necessary data at step 127. The server application 120 process is suspended at step 128 until data is received from the specified cgi-bin application 140.

When the output is received from the specified cgi-bin application 140, the server application 120 receives the output and error statuses and receives the exit status of the cgi-bin application 140 process at step 129. The server application 120 then writes the output received from the cgi-bin application 140 and returns that output to the client requesting service at step 131. The server application 120 then exits that session, loops back to step 122, and suspends itself until a new request is received.

Figure 7:
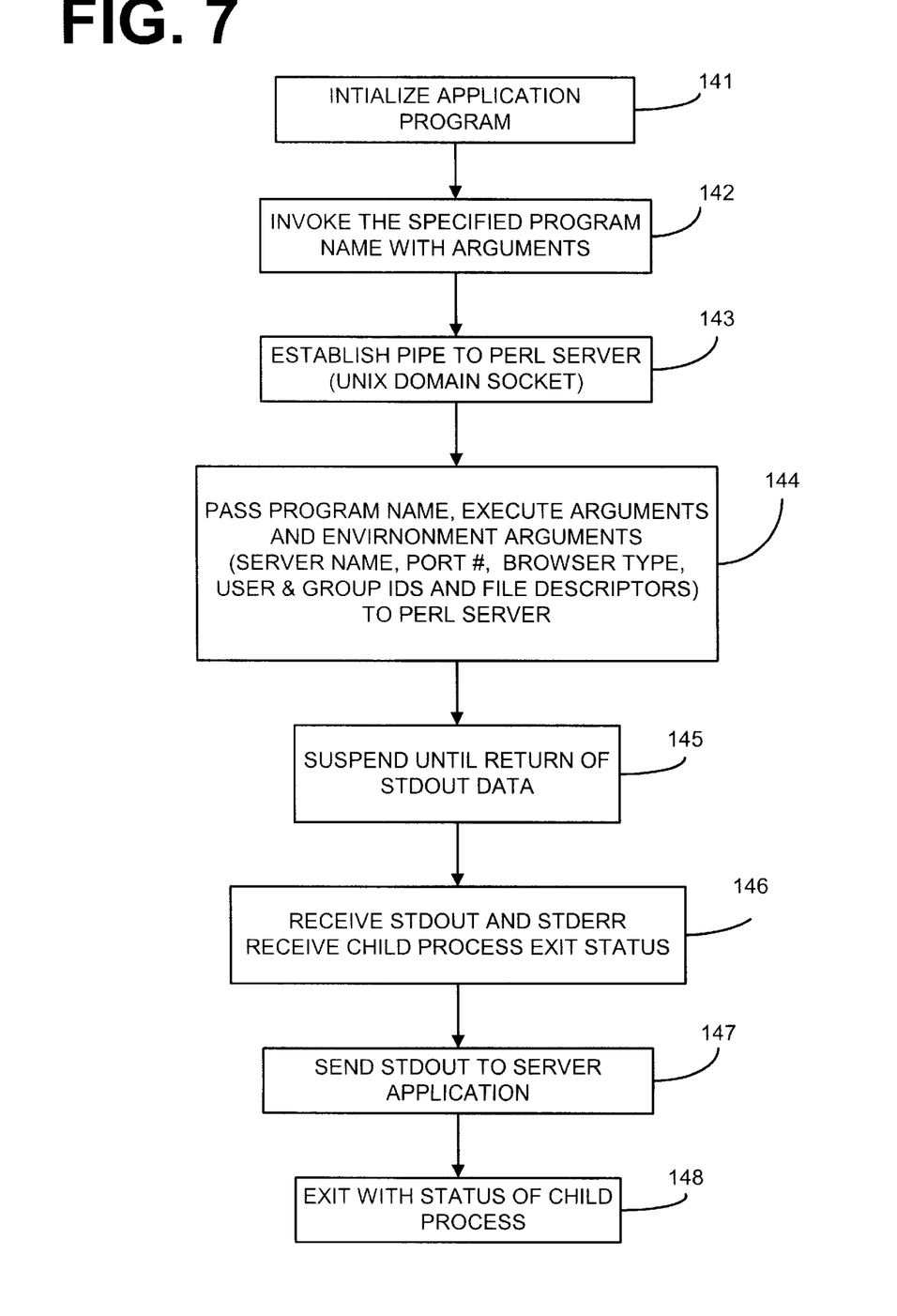
FIG. 7 is a flow chart of the process for the service application program of the present invention, as shown in FIG. 4.

Illustrated in FIG. 7 is the flow diagram for the cgi-bin application 140. As noted above, the cgi-bin application 140, by moving the code that was in the individual cgi-bin scripts into one Perl server daemon process 160, can be executed much faster because the individual cgi-bin scripts are replaced by an object file (the proxy) that calls the daemon process to execute the code that would be in the cgi-bin script on the proxy's behalf First, the cgi-bin application 140 is initialized at step 141. The cgi-bin application 140 receives the request for the specified service with the program name and arguments at step 142. The cgi-bin application 140 establishes a pipe to the necessary Perl server 160 at step 143. In the preferred embodiment, a Unix domain socket is established.

The cgi-bin application 140 passes the specified program name, execution argument and environment arguments to the Perl server 160 identified to provide the requested service at step 144. The cgi-bin application 140 suspends processing until the return of data at step 145. After data is received from the server, the cgi-bin application 140 unsuspends itself to receive the output and error output of the child Perl server 180 and receive any exit status at step 146. The cgi-bin application 140 takes the output of the Perl server 160 and returns it to the server application 120 at step 147. The cgi-bin application 140 then terminates its execution with the exit status of the child Perl server 180 process at step 148.

Figure 8:
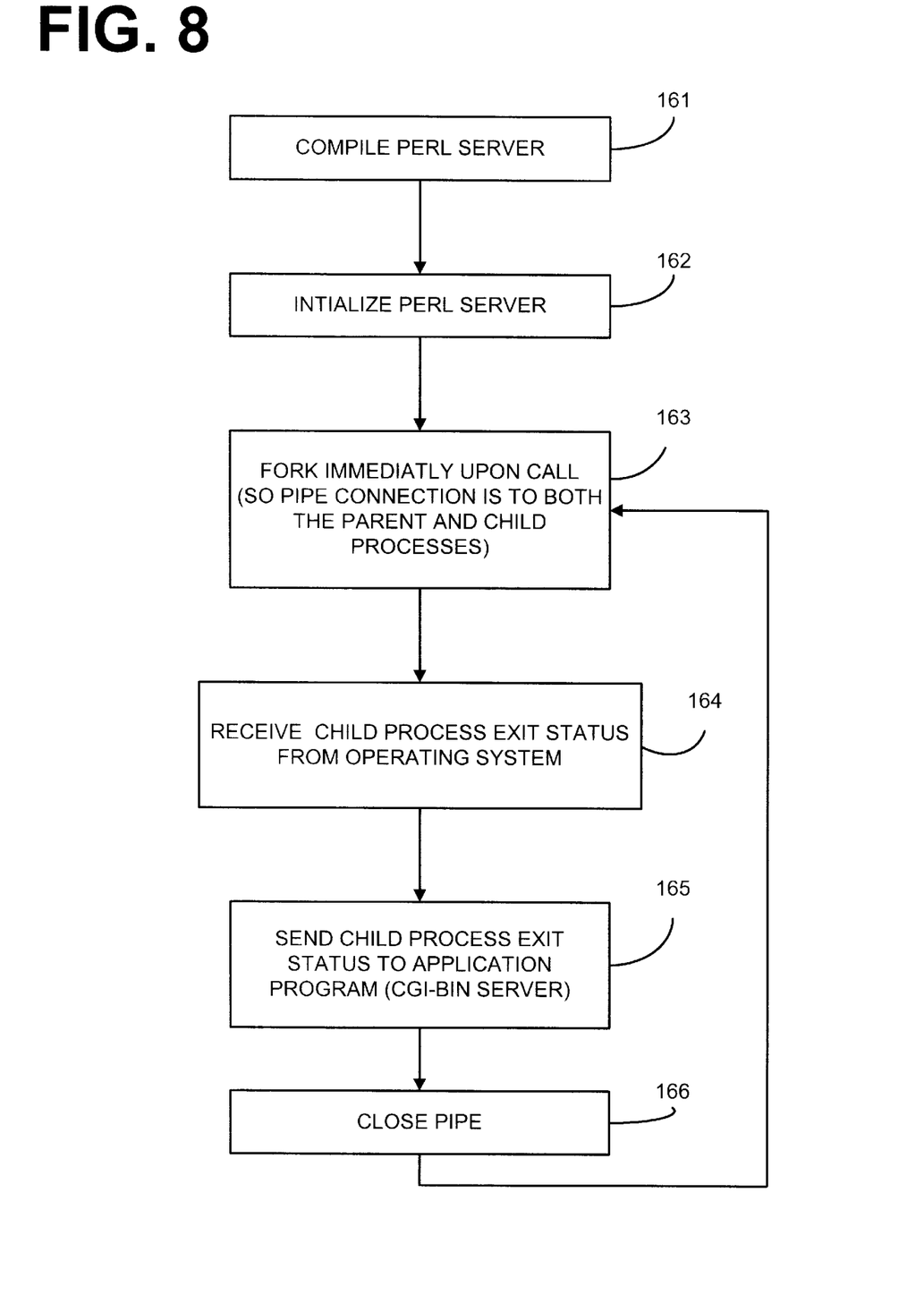
FIG. 8 is a flow chart of the process for the Perl server process of the present invention, as shown in FIG. 4.

With regard to FIG. 8, illustrated is shown the process of the Perl server 160. First, the Perl server 160 is compiled at step 161. Next, the Perl server 160 is then initialized at step 162, and then waits to be called. Immediately upon being called by an cgi-bin application 140, the Perl server 160 forks a child Perl server 180 process with the pipe connection thereby establishing communication with cgi-bin application 140, parent Perl server 160 and the child Perl server process 180 at step 163. The Perl server 160 then waits to receive the exit status from the child Perl server process 180 that is forked to provide the requested service at step 164. The exit status of the child Perl server process 180 is sent to cgi-bin application 140 at step 165. The process is returned to the wait state at step 163 to wait for the next pipe connection to be established.

As noted above, Perl is often used to implement the cgi-bin application 140 (i.e., cgi-bin scripts). These scripts normally are invoked by the http deamon to do a single job and then they exit. The problem with using Perl is that the Perl code in the cgi-bin script is compiled every time the cgi-bin script is run. When the size of the cgi-bin scripts gets large, the amount of time spent compiling the Perl code can be a performance limiter.

In, the present invention, the Perl Server increase execution performance by forking itself and then having the child Perl server process 180 run the already compiled code for the specific cgi-bin script. The advantage of doing this is that the Perl code in the parent Perl server process 140 is compiled only once, when the Perl server 140 is started. With large Perl scripts it is faster to connect up to the server and have it fork a child and execute the correct code than it is to compile and run the correct code.

Figure 9:
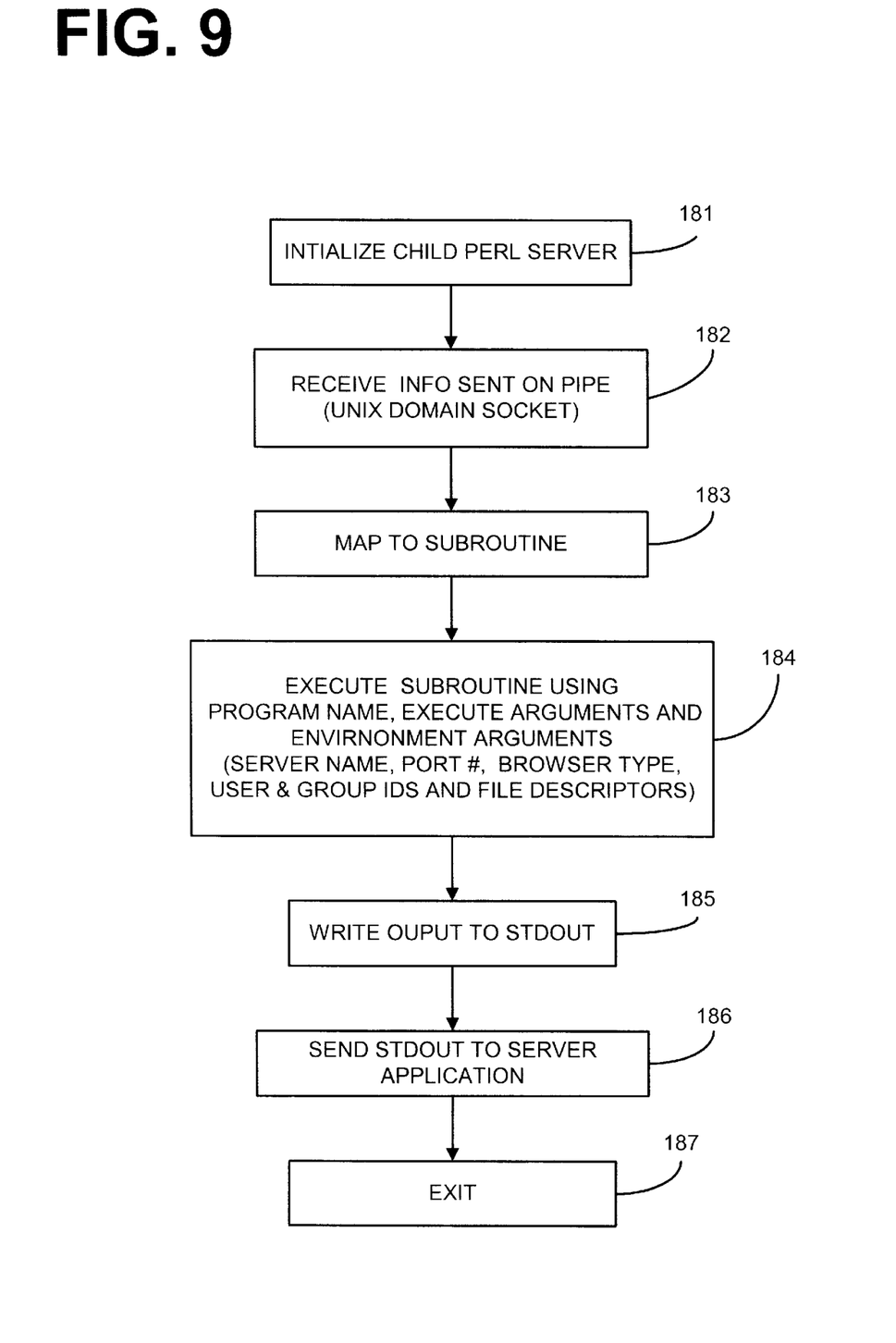
FIG. 9 is a flow chart of the process for the Perl child server process of the present invention, as shown in FIG. 4.

Illustrated in FIG. 9 is the process of the child Perl server 180. The child Perl server 180 is initialized at step 181. The child Perl server 180 receives the information sent on the pipe created by the cgi-bin application 140 at step 182. The child Perl server 180 then maps to the specified sub routine identified in the information that was communicated over the pipe and received at step 182 above. The child Perl server 180 then executes the specified sub routine using the specified program name, execution arguments, and environment arguments present in the information received on the pipe at step 182. The output of the specified execution sub routine is moved to the stdout field at step 185 for return to the server application 120 at step 186. The child Perl server 180 then exits at step 187.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A computer system for increasing performance of interpreted languages execution, comprising:

a server computer device;

a first logic, within said server device, configured to maintain an interpreted language program in a compiled code form ready for interpretation during execution, and when said interpreted language program is executed, said first logic forks a child logic to perform a required task; and a second logic configured to determine the address of said first logic, and causing the execution of said first logic.

2. The computer system of claim 1, wherein said first logic is executed by a client computer device.

3. The computer system of claim 1, further comprising:

a third logic configured to dispatch a specific second logic from a plurality of second logic.

4. A computer system for increasing performance of interpreted languages execution, said system comprising:

a client browser mechanism that requests performance of a required task;

a server mechanism is used for finding a specified application mechanism from a plurality of application mechanisms, to satisfy the client browser mechanism request to perform the required task, and said server mechanism is used for invoking said specified application mechanism;

said specified application mechanism is used for finding and executing a specified Perl server mechanism from a plurality of Perl server mechanisms to satisfy the client browser mechanism request to perform the required task;

said Perl server mechanism residing in a server memory maintaining a perl program in a compiled code form that is ready for interpretation during execution, said Perl server mechanism for forking a child process to satisfy the client browser mechanism request to perform the required task.

5. A method for use in a computer system for increasing performance of interpreted languages execution, the method comprising the steps of:

providing a server computer device;

maintaining an interpreted language program in a compiled code form ready for interpretation during execution, within said server device;

determining a specific second logic from a plurality of second logic to cause the execution of said interpreted language program; and forking a child process to perform a required task when said interpreted language program is executed.

6. The method of claim 5, further including the step of:

executing interpreted language program by a client computer device.

7. The method of claim 5, wherein said determining a specific second logic step further includes the steps of:

determining the address of said interpreted language program by said second logic; and causing the execution of said interpreted language program by said second logic.

8. A computer system for increasing performance of interpreted languages execution, comprising:

means for providing a server computer device;

means for maintaining an interpreted language program in a compiled code form ready for interpretation during execution, within said server device;

means for finding a specific determining means from a plurality of determining means to cause the execution of said interpreted language program; and means for forking a child process to perform a required task when said interpreted language program is executed.

9. The computer system apparatus of claim 8, further comprising:

means for executing interpreted language program by a client computer device.

10. The computer system apparatus of claim 8, wherein said finding means further comprises:

means for determining the address of said interpreted language program; and means for causing the execution of said interpreted language program.

11. The computer system of claim 1, wherein said interpreted language program is a perl program.

12. The method of claim 4, wherein said interpreted language program is a perl program.

13. The computer system apparatus of claim 8, wherein said interpreted language program is a perl program.

* * * * *

UNITED STATES PATENT AND TRADEMARK OFFICE
CERTIFICATE OF CORRECTION

PATENT NO.    : 6,141,793                                    Page 1 of 1
DATED         : October 31, 2000
INVENTOR(S)   : Craig W. Bryant et al.

It is certified that error appears in the above-identified patent and that said Letters Patent is hereby corrected as shown below:

Column 6,
Line 3, after "behalf" insert -- . -- and begin a new paragraph Column 8,
Line 51, delete "claim 4" and insert therefor -- claim 5 --

Signed and Sealed this

Twenty-second Day of October, 2002

Attest:

Attesting Officer

JAMES E. ROGAN
Director of the United States Patent and Trademark Office